J. PRICE.
Hay-Press.

No. 204,757. Patented June 11, 1878.

Witnesses Inventor
Jacob Price
by Dewey & Co.
Attys

UNITED STATES PATENT OFFICE.

JACOB PRICE, OF SAN LEANDRO, CALIFORNIA.

IMPROVEMENT IN HAY-PRESSES.

Specification forming part of Letters Patent No. 204,757, dated June 11, 1878; application filed December 29, 1877.

*To all whom it may concern:*

Be it known that I, JACOB PRICE, of San Leandro, county of Alameda, and State of California, have invented a Continuous Hay-Press; and I do hereby declare the following to be a full, clear, and exact description thereof, reference being had to the accompanying drawings.

The object of my invention is to provide a machine for baling hay, in which the hay or straw can be fed continuously into one end of the machine, compressed into one single continuous bale as it passes through the machine, and cut off into proper-sized bales at the opposite end of the machine, thus forming a continuously-operating hay-press, all as hereinafter described.

Figure 1:
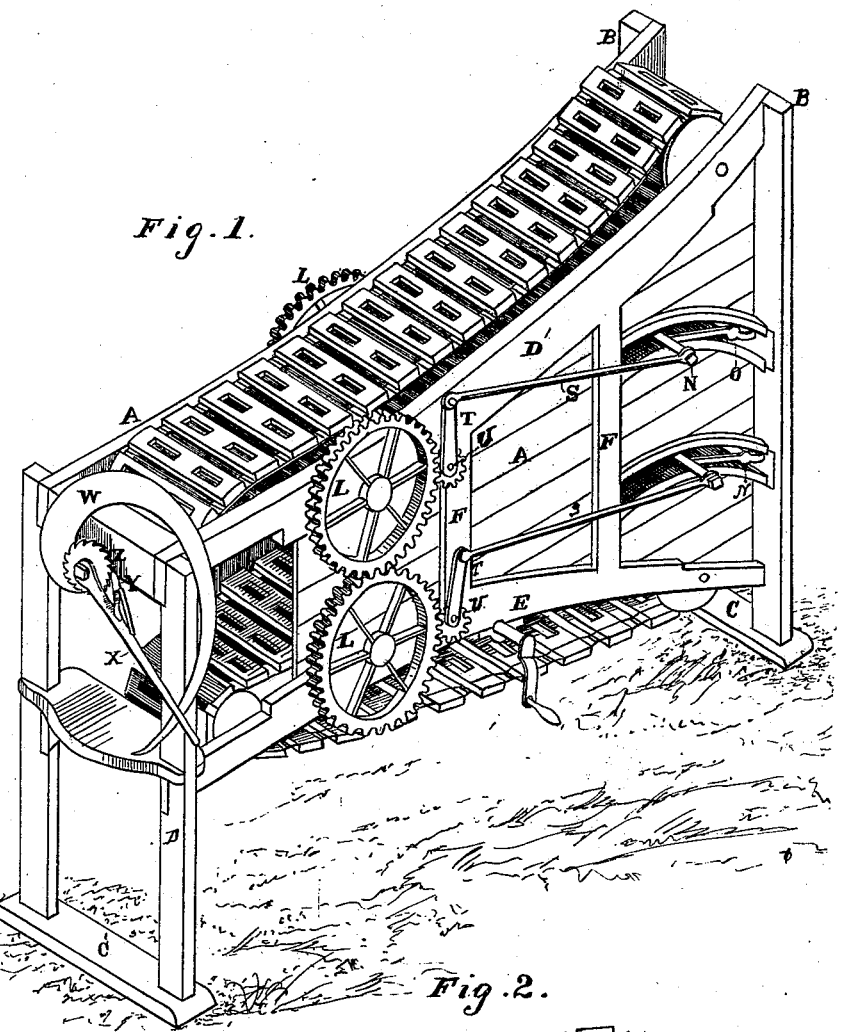
Figure 2:
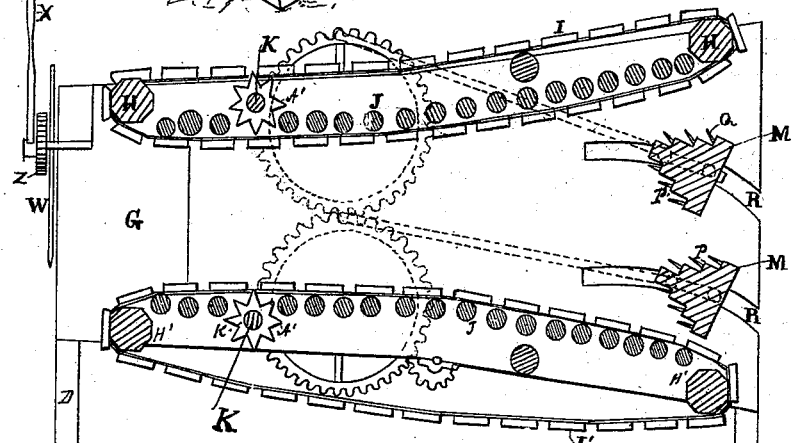

Referring to the accompanying drawings, Figure 1 is a perspective view of my hay-press. Fig. 2 is a section of the same.

My machine is operated horizontally, in order to avoid lifting the hay or straw to any considerable height in the operation of feeding it into the end of the machine, although it might be made and operated in a vertical position, if preferred.

The body of the press consists of two upright sides, A A, which are placed at a distance apart equal to the width of the bale of hay to be pressed. Each side is supported at the feed end by an upright post, B, which steps in a transverse base-beam, C, while their opposite ends are supported by an upright frame, D, which is strongly tied together by cross-beams, as hereinafter described, and which is also secured upon a transverse base-beam, C'.

The sides A A are the highest at the feed end, and they gradually narrow or taper toward the opposite or discharge end, as represented.

To form each of the sides, I construct a frame consisting of an upper beam, D', and a lower beam, E, and these beams are connected or braced by uprights F F at suitable points. This frame is boarded up inside to form the sides of the press; but these sides do not extend entirely to the frame D at the discharge end. A space, G, is left between the ends of the sides and frame, where the bale is tied.

I mount a drum or roller, H, between the upper beams D' D', near each end of the machine, and around these two drums I place an endless slat-belt, I. I also mount a similar drum or roller, H', between the lower beams E at each end of the machine, and around these drums I place another endless slat-belt, I', so that the two belts will be convergent toward the discharge end of the machine. I also arrange a series of rollers, J J J, between each pair of beams D' D' and E E, just inside of the lower half of the upper belt and inside the upper half of the lower belt, so as to give the inside portion of each belt a solid bearing when the straw is pressed between them, and to avoid as much friction as possible.

Each belt I make of parallel slats or blocks, hinged together to give the desired flexibility, and each slat or block has one or more holes through it.

Each of the shafts K, which drive the belts, passes through between the two parts of each belt, and is provided with spurs A' A', which engage with the openings in the slats, so that the power is applied in a positive manner to drive the belts.

Each shaft K has a large spur-wheel, L, on one end, and these two spur-wheels engage with each other, so that power applied to drive one drives both. This arrangement of belts between the sides E E provides a widened or flaring opening at one end of the machine, into which the hay or straw is fed, while the converging belts draw it toward the opposite end, and compress it between them into a continuous bale, corresponding in size with the width of the box in one direction and with the distance between the belts in the other direction.

In order to feed the straw into the machine, I provide an automatic feeding device, which consists of two alternately-reciprocating blocks or feeders, M M, of the form shown at Fig. 2, mounted one above the other in the mouth or widest end of the machine. Each block is provided with two projecting arms or journals, N O, at each end, and its upper face is inclined and formed into steps or ridges P P, in each of which ridges a number of pins, Q, are secured so as to project beyond the edges of the ridges.

In each side of the machine I make two curved slots, R R, at the feed end, so that the slots on one side will be opposite the slots on the opposite side.

A pitman or connecting-rod, S, connects one arm of each block with a crank, T, which is attached to the end of a shaft, U, on the side of the machine, and the shaft U is driven by gearing from the main driving-shaft. The cranks are set oppositely, so that as the belts travel uniformly in one direction the blocks will be reciprocated back and forth alternately. The peculiar shape of the slots R R causes the feeder-blocks to make a semi-rotation as they approach the outer end of the slots, so as to bring the ridged and toothed face uppermost. The straw is then dumped with a fork upon them, so as to be carried back into the machine when the feeder moves back. These feeders also serve to compact the straw and crowd it forward into the body of the machine, so that the moving belts will grapple and press it between them. The belts I I' are geared to move quite slowly, so that the pressed hay is carried forward sufficiently slow to allow it to be tied or bound as it passes through the space G between the ends of the sides A and the frame D. The belts I I' extend across this space both above and below, so that the hay, after it is bound, passes through between the uprights of the frame D.

W is a curved knife, which is mounted on the outside of the frame D E F. This knife is operated by a lever, X, pawl Y, and ratchet Z, so that when a sufficient length of the pressed and bound hay is projected outside it will cut it off. This knife is made in the form of an involute, so that its cutting-point gradually recedes from the center as it is rotated. By this construction, combined with the lever-power, I am able to cut the bale off quite easily.

I thus provide a continuously-operating hay-press, into which hay or straw can be fed at one end and turned out in bales at the opposite end.

Having thus described my invention, what I claim, and desire to secure by Letters Patent, is—

1. A continuously-operating hay-press consisting of a press-box, two convergent endless slat-belts, I I', and the knife W, combined and arranged to operate substantially as above described.

2. A hay-press consisting of two endless belts, I I', mounted in a suitable box so that the two belts approach each other at one end, in combination with one or more feeding or crowding blocks, M, for pressing the straw forward between the wide ends of the belts, and a knife, W, for cutting off the bales, combined and arranged substantially as specified.

3. A press-box provided with endless belts I I', and having sides A A shorter than the endless belts at the narrow end, so as to provide a space, G, between the ends of the sides and the end frame D, for tying the bale, in combination with the end frame D and knife W, substantially as and for the purpose specified.

4. The sides A A of a continuous hay-press provided with the slots R R, curved as described, in combination with the feeder-blocks M M, the upper faces of which are beveled, ridged, and provided with pins Q, said blocks being operated by a crank and pitman, substantially as described.

5. The involute knife W, operated by the lever X, pawl Y, and ratchet Z, substantially as and for the purpose described.

In witness whereof I have hereunto set my hand.

JACOB PRICE.

Witnesses:
  JNO. L. BOONE,
  FRANK A. BROOKS.